United States Patent [19]
Paivinen

[11] 3,708,690

[45] Jan. 2, 1973

[54] SHIFT REGISTER

[75] Inventor: John O. Paivinen, Newtown Square, Pa.

[73] Assignee: Mos Technology, Inc., Valley Forge, Pa.

[22] Filed: Feb. 22, 1971

[21] Appl. No.: 117,437

Related U.S. Application Data

[63] Continuation-in-part of Ser. No. 108,124, Jan. 20, 1971, abandoned.

[52] U.S. Cl. .............307/221 R, 235/92, 307/221 C, 328/43, 328/61, 340/174 SR

[51] Int. Cl. ............................................G11c 19/00

[58] Field of Search ........307/221, 293, 223; 328/43, 328/61; 235/92; 340/173 SR, 174 SR

[56] References Cited

UNITED STATES PATENTS

| | | | |
|---|---|---|---|
| 3,313,926 | 4/1967 | Minnick | 307/221 R |
| 3,174,106 | 3/1965 | Urban | 307/221 R |
| 3,252,009 | 5/1966 | Weimer | 307/221 R |

*Primary Examiner*—John S. Heyman
*Assistant Examiner*—R. C. Woodbridge
*Attorney*—Robert S. Dunham, Lester W. Clark, Gerald Griffin, Howard J. Churchill, R. Bradlie Boal, Christopher C. Dunham, Robert Scobey, Henry T. Burke, Raymond J. McElhannon and Charles W. Bradley

[57] ABSTRACT

A multi-phase shift register having a plurality of parallel columns each comprising n stages, where *n* is preferably greater than 3, and where the data is advanced along each such column by first shifting the data from its $n^{th}$ stage to the column output terminal, then from the preceding stage to the $n^{th}$ stage, and then from each of the next preceding stages sequentially to their succeeding stages, until the first stage of the column is reached, whereupon the first stage is emptied of data and free to receive new input data. The advance sequence of the parallel columns is synchronized with the application of the input data, and this sequence is constantly repeated, so that successive input bits of data are directed to different respective columns of the shift register, and then along these columns to their common output terminal, where the pulses are recombined to form the original input pulse series. In one embodiment the advance sequence is delayed one clock pulse in each successive column, so that each column delivers an output pulse, and is ready to receive new input data, one clock pulse behind the preceding column. In another embodiment, successive n bits of data are delayed relative to one another and applied simultaneously to different first stages of *n* parallel columns, and then are advanced along the column simultaneously with the same advance sequence. At the output of the columns, the bits of data are again delayed and recombined to form the original time sequence series. Several of these multi-phase shift registers are generally connected in cascade, and the advance sequences of the cascaded registers synchronized, so that a large number of data bits may be stored and shifted along the respective columns of the register.

32 Claims, 7 Drawing Figures

INVENTOR.
JOHN O. PAIVINEN
BY
Ward McElhannon Brooks & Fitzpatrick
ATTORNEYS

INVENTOR.
JOHN O. PAIVINEN
BY
Ward McElhannon Brooks & Fitzpatrick
ATTORNEYS

INVENTOR.
JOHN O. PAIVINEN
BY
Ward McElhannon Brooks & Fitzpatrick
ATTORNEYS

INVENTOR.
JOHN O. PAIVINEN

BY

Ward McElhannon Brooks Fitzpatrick
ATTORNEYS

INVENTOR.
JOHN O. PAIVINEN
BY
Ward McElhannon Brooks & Fitzpatrick
ATTORNEYS

SHIFT REGISTER

This application is a continuation-in-part of applicant's earlier filed application Ser. No. 108,124, now abandoned, entitled Shift Register, which was filed Jan. 20, 1971.

This invention relates to electronic digital circuits such as shift registers, for storing, delaying and shifting pulses.

In circuits of this type, information in the form of electrical pulses is stored in a plurality of stages and shifted from stage to stage. Information enters the circuit from an input terminal, or from a recirculation path connected to the output of the circuit, and is transferred from state to stage by shift pulses. The transfer may be only in the forward direction or it may be bidirectional.

In the shift registers of the prior art, all of the data stored in a shift register is shifted simultaneously. Consequently, there must be an empty storage location to receive each stored bit of data, so that alternate storage locations of the register must always be empty. Thus, each stage of the register generally includes two storage sites. One shift pulse transfers the stored data from one storage site in a stage to the second, where it is generally stored with the opposite polarity, while the next shift pulse transfers the data from the second storage site to the first site of the next stage.

These prior art shift registers have the following disadvantages: (1) extra components are necessary to provide two separate storage sites in each stage, and (2) the upper frequency limit is unnecessarily restricted because at least two shift pulses and shift operations are necessary to transfer one bit of information from one stage of the register to the next. Further, in many prior art shift registers there is substantial power dissipation because there is a d.c. current conduction path to ground in each stage.

Accordingly, it is an object of this invention to provide a novel digital storage and time delay device and shift register which is capable of storing multiple bits of information and transferring a bit of such information from one stage to the next, each stage having only one storage site, in one clock pulse time.

It is a further object to provide an integrated circuit serving as a digital storage and delay device that occupies a minimum amount of space and is characterized by low power consumption.

In accordance with these objects, a shift register is provided having a plurality of parallel columns each comprising n stages, where n is preferably greater than three. The input data or bits of information are applied to different ones of the parallel columns, and the data in each column is advanced along to its column output terminal by first advancing the data from it $n^{th}$ stage to the column output terminal, then advancing the data from the preceding $n-1$ state to the previously emptied $n^{th}$ stage, and then advancing the data in each of the preceding stages of the column sequentially to their succeeding stages, until the first stage of the column is emptied of data and free to receive new input data. New input data is then advanced to the emptied first stage and the advance sequence repeated.

The advance sequence of the parallel columns is synchronized with the application of the input bits of information, and this sequence is constantly repeated, so that successive input bits of information are directed to different respective columns of the shift register, and then along these columns to a common output terminal where the bits of information are recombined to form the original input series applied to the shift register.

In one embodiment the advance sequence of bits of information is delayed one clock pulse in each successive column, so that each column delivers an output pulse, and is ready to receive new input data, one clock pulse behind the preceding column. Specifically, in this embodiment the input terminal of the shift register is connected directly to the first stage in each column, and the output terminal is connected to the last or $n^{th}$ stage in each column through different AND gates. At each phase or time period, one of the shift pulses is applied to one stage in each of the columns and to one AND gate to read one bit of information from, and to write one bit into, one column of the shift register, while one bit is moved one stage toward the AND gates in every other column. In this way, for each phase or period of time, one bit of information is stored in the multicolumn shift register, while another bit of information is read out.

Specifically, at a first phase time, a shift pulse is applied to the AND gate and first stage of a first column, causing a bit of information to be advanced to the output terminal, and causing a new bit of information to be read into its empty first stage, the first column being the only column having an empty first stage at this time. At the same time, the same shift pulse is applied to a different stage in each of the other columns, causing one bit of information to be advanced to that stage from the preceding stage, so that each column has a new empty stage one stage higher in the column than formerly. After the first shift pulse terminates, the second column is the only column having an empty first stage.

The next shift pulse occurring at the second phase time is applied to the AND gate and the first stage of the second column, to read a second bit of information from the second column while a bit of information is read into the first stage of this column, the second column being the only column having an empty first stage at this time. One stage of each of the other columns also receives the second shift pulse on an empty stage, to shift a bit of information to that stage from the preceding stage, so that each of the empty stages in these columns is again moved one stage closer to the first stage of the column.

The above process continues for a full cycle of shift pulses, with each of the different shift pulses being applied to the AND gate and the first stage of a different column, and each different shift pulse also being applied to a different stage in each of the other columns.

In another arrangement, n successive inputs bits of information are delayed relative to one another in storage circuits, and then applied simultaneously to the first stage of each column of a shift register having n columns, with n stages in each column. In this arrangement, the advance sequence of each column is the same, so that all columns simultaneously deliver an output bit of information from their respective last or $n^{th}$ stages, and simultaneously receive new input data at their first stage. The bits of information simultaneously delivered from the last stages of the columns are then processed in storage circuits and recombined sequentially to form the original input pulse series.

In a preferred circuit implementation of the present invention, each stage of the shift register includes three MOS transistors. These include (1) a first MOS transistor that is rendered conductive by a clock pulse at the beginning of each phase, and remains conductive for a period of time shorter than the period of a shift pulse; (2) a second MOS transistor that is rendered conductive only by a selected shift pulse occurring at a selected time; and (3) a third MOS transistor that is rendered conductive only by a signal of a first level of two possible levels of signals in the preceding stage of the column. The bits of information are stored in a capacitor, which is formed of the parasitic capacitance between the input electrode or gate of the third MOS transistor of the next stage and ground.

If a shift pulse is not applied to the second MOS transistor, the charge on the storage capacitor remains unchanged and the bit of information continues to be stored on the capacitor. When the second transistor receives a shift pulse, the first and second transistors are both conductive for part of the shift pulse time, causing the capacitor to be charged by the clock pulse, but before the shift pulse terminates and after the termination of the clock pulse, the first transistor becomes nonconductive. If the third transistor is receiving a signal of a first level from the preceding stage, it is conductive during the remainder of the shift pulse, after the termination of the clock pulse, so that charge is drained from the capacitor through the second and third transistors, leaving the second level signal stored on the capacitor. If the third transistor is receiving a signal of the second level from the preceding stage, it is nonconductive and the charge remains on the capacitor even though the second transistor is conductive until the end of the shift pulse.

With this mechanization, each empty stage, when it receives a shift pulse, stores a signal that is of the other level from the signal stored in the preceding stage. In this manner, a bit of information is transferred from stage to stage, being represented by a different one of the two levels of signals in alternate stages.

Other specific circuitry for implementing each stage of the shift register is set forth hereinafter.

The digital delay and shift register device of this invention has several advantages. These include: (1) fewer components and, in the case of integrated circuits, less space on a substrate, are required for a given storage capability as compared to conventional shift registers, because only one storage site is necessary in each stage of the shift register, whereas conventional shift registers require two storage sites in each stage; and (2) less power is consumed than some prior art arrangements because there is no d.c. current conduction path to ground.

The above-noted and other features of the invention will be better understood from the following detailed description when considered with reference to the accompanying drawings, in which.

GENERAL FEATURES OF THE SHIFT REGISTER

Figure 1:
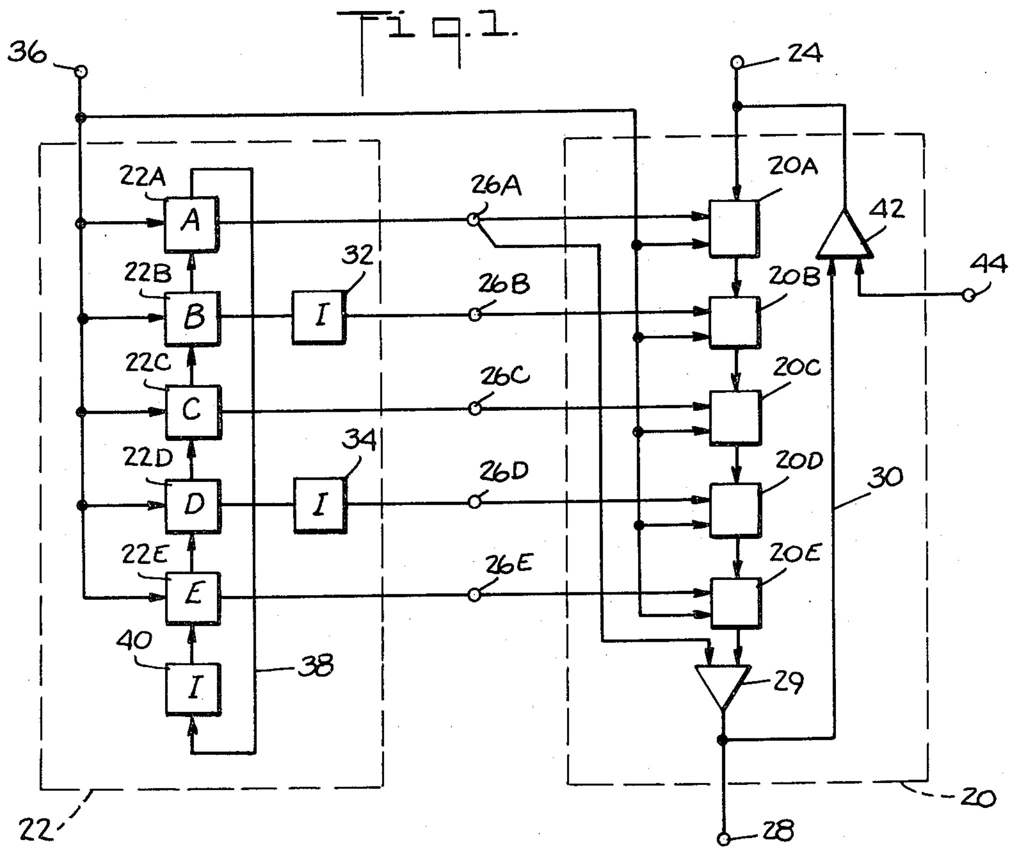
FIG. 1 is a schematic drawing of a portion of a shift register embodying the invention.

In FIG. 1, one column 20 of a shift register is shown electrically connected to a ring counter 22 which provides shift pulses to operate the column 20 of the shift register. Several columns similar to column 20 are combined into a matrix to form a shift register such as that shown in FIGS. 3, 4, 5 and 6. Column 20 includes five stages 20A – 20E connected in series in the order named. Each of these stages corresponds in structure to a one-half bit stage of a conventional shift register in that it includes one storage site to store one bit of information.

According to the present invention, four of the five stages 20A – 20E normally store one bit of information, while one stage is empty. The empty stage actually stores a potential in a manner similar to the other four stages but is considered empty because it has transmitted its bit of information to the next stage in the column, and will receive the next shift pulse which will cause it to store the bit of information from the preceding stage.

If the stages 20A and 20D are storing a negative potential, indicating a binary one, while stages 20B and 20E are storing a binary zero, which in the preferred embodiment is ground level potential, and stage 20C is "empty", then, during the next clock pulse period, the binary zero in stage 20B is shifted to stage 20C as a binary one, leaving stage 20B empty. Further, during the following clock pulse period, stage 20B receives and stores the binary one in stage 20A as a binary zero, leaving stage 20A empty, so that two bits of data have been transferred one stage each in two clock pulse periods.

In a conventional shift register, two stages such as 20A and 20B are necessary to store and transfer each bit of information in the register, and so stages 20A and 20B serve as one-half bit stages, or together form only a single stage for storing one bit. However, they each form a separate stage in the shift register of this invention.

Column 20 includes an odd number of stages. Consequently, the output from the stage 20E has an opposite level of potential or, in other words, an inverted bit, from the corresponding bit of information entered into stage 20A earlier. To provide the correct signal level, an inverter is included between stage 20E and the output terminal.

Generally, another logic unit such as an AND gate, which is incorporated in the shift register for another purpose, also performs the inversion, although a separate inverter may be included instead. On the other hand, the columns in some shift registers have an even number of stages, in which case it is not necessary to invert the final bit of information.

To receive input information bits and shift pulses, the column 20 of the shift register includes an input terminal 24 connected to the first stage 20A and five shift pulse terminals 26A – 26E, each of which is electrically connected to a corresponding one of the five stages 20A – 20E. The last stage 20E is applied to an output terminal 28 and to a recirculation path 30 through the AND gate 29. The recirculation path 30 is connected to the input terminal 24 of the first stage 20A through AND gate 42.

The AND gate 29 has one of its two inputs connected to terminal 26A and the other connected to the output terminal of the last stage 20E. The output terminal of AND gate 29 is connected to output terminal 28 of column 20 and to one of the two inputs to AND gate 42, the other input 44 of AND gate 42 being used to control recirculation.

To provide the shift pulses to the terminals 26A – 26E, the ring counter 22 includes a corresponding five stages 22A – 22E, each having its output connected to a corresponding one of the terminals 26A – 26E. The stages are connected in series in the order of 22E – 22A, which is the reverse order from the stages 20A – 20E of the shift register 20.

The ring counter 22 may employ essentially the same circuit as the shift register 20, but be operated with a binary one in only one position and continually recirculating. In such an arrangement, since the polarity of the binary one is inverted as it passes from stage to stage, inverters are required on the output terminals of alternate stages.

The alternate stages 22B AND 22D of the ring counter 22 are therefore electrically connected through inverters 32 and 34 to the corresponding terminals 26B and 26D, so that at an appropriate time in the cycle their output to these terminals corresponds in polarity to the negative potential of the binary one that is initially stored in the first stage 22E.

To apply the clock pulses to the stages 22A – 22E of the ring counter 22 and to the stages 20A – 20E of the shift register 20, a source of clock pulses is connected to the terminal 36 and applied simultaneously to the clock pulse terminals of each of these stages.

The last stage 22A of the ring counter 22 is connected to the first stage 22E through a recirculation path 38 that includes an inverter 40 for receiving the circulating bit from the last stage 22A, inverting it in polarity, and applying it to the input terminal of the first stage 22E.

The recirculating path 30 in the shift register 20 does not require a separate inverter since the AND gate 29 is of the inverting type, sometimes called a NOR gate, so as to provide output bits from column 20 of the proper polarity.

Figure 2:
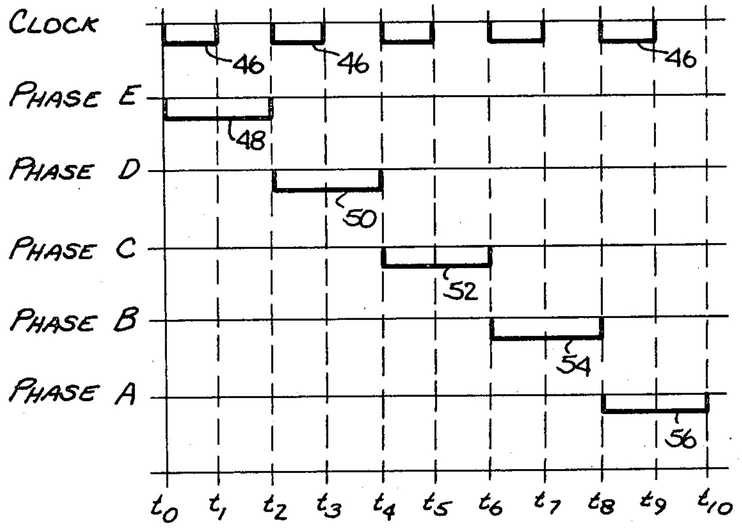
FIG. 2 is a graphic representation of the timing pulses for operating a shift register embodiment of the invention.

In FIG. 2, a graph is shown illustrating the clock pulses 46 and shift pulses 48, 50, 52, 54 and 56 with idealized waveforms.

In operation, clock pulses 46 are applied to the terminal 36 (FIG. 1). One stage of the ring counter 22 is always set to provide a binary one output and the clock pulses 46 shift this binary one from stage to stage in the order of the stages 22E to 22A, as shown by the arrows on the connecting conductors in FIG. 1. For example, assume that just prior to time $t_0$, stage 22A contains a binary one. When the first clock pulse that extends from time $t_0$ to $t_1$ starts, stage 22A supplies the binary one negative-going voltage pulse, which is inverted by the inverter 40, to set stage 22E to provide the negative-going waveform 48 shown in the second curve of FIG. 2.

Stage 22E provides the negative-going waveform 48 until the next clock pulse 46 starts at time $t_2$. At time $t_2$, stage 22E sets stage 22D to provide a positive-going output waveform, which is inverted by the inverter 34 and passed to terminal 26D as the negative-going waveform 50. This waveform lasts until the next clock pulse which starts at time $t_4$, at which time stage 22D sets stage 22C to provide the negative-going waveform 52. This process continues so as to provide a continuous succession of the voltage waveforms 48, 50, 52, 54 and 56 shown in FIG. 2 to the stages 20A – 20E of the column 20 of the shift register, with the pulses being applied first to stage 20E, then to 20D, and so on to 20A before again being applied to 20E.

Column 20 of the shift register at all times includes one stage that is considered to be empty of data information and four stages that contain data. A stage that is considered to be empty is a stage that has transmitted a bit of information to the next stage in the column, or through the AND gate at the end of the column, if it is the last stage in a column, and has not yet received a new bit of information. In a column such as 20 in FIG. 1, the empty stage will receive a shift pulse at the next clock pulse time to permit it to receive a bit from the preceding stage, at which time it will cease being empty and the preceding stage will be the empty stage in the column.

If, for example, stage 20E is empty then at the next clock pulse time, ring counter stage 22E provides a voltage pulse 48 through terminal 26E to stage 20E to permit a bit of data to pass from stage 20D to 20E, causing stage 20D to be empty. At the beginning of the next clock pulse time, stage 22D of the ring counter 22 passes a voltage pulse 50 through inverter 34 to the terminal 26D of stage 20D, to cause data to be read from stage 20C to stage 20D, leaving stage 20C empty of data. This process continues until stage 20A is empty and ring counter stage 22A generates voltage pulse 56.

Shift pulse 56 causes the data in stage 20E to be read through AND gate 29 to the terminal 28, leaving stage 20E empty. It may also be written back into stage 20A, which is empty, by applying a pulse to terminal 44 to open gate 42. On the other hand, new data may be applied to stage 20A from terminal 24 to fill this stage when shift pulse 56 is applied. After shift pulse 56 is applied, the sequence for reading data down one stage at a time is repeated.

From the above explanation, it will be seen that in shift register column 20 only one bit of information is shifted from one stage to another at one time, and therefore it is not necessary to provide temporary storage between alternate stages. Instead, column 20 is able to store one bit in each of its stages except one, which stage serves as a temporary storage or empty location into which the next bit to be transferred is shifted during the next shift pulse. This is in contrast to a conventional shift register, where one half of each stage serves as a temporary storage area during the shifting of information from one stage to the next, because all of the information bits in the shift register are shifted simultaneously.

However, because only one bit of information is transferred from the column 20 for every five shift pulses, several such columns are preferably combined together to form a single shift register from which a bit of information may read for each shift pulse.

FIRST SHIFT REGISTER EMBODIMENT

Figure 3:
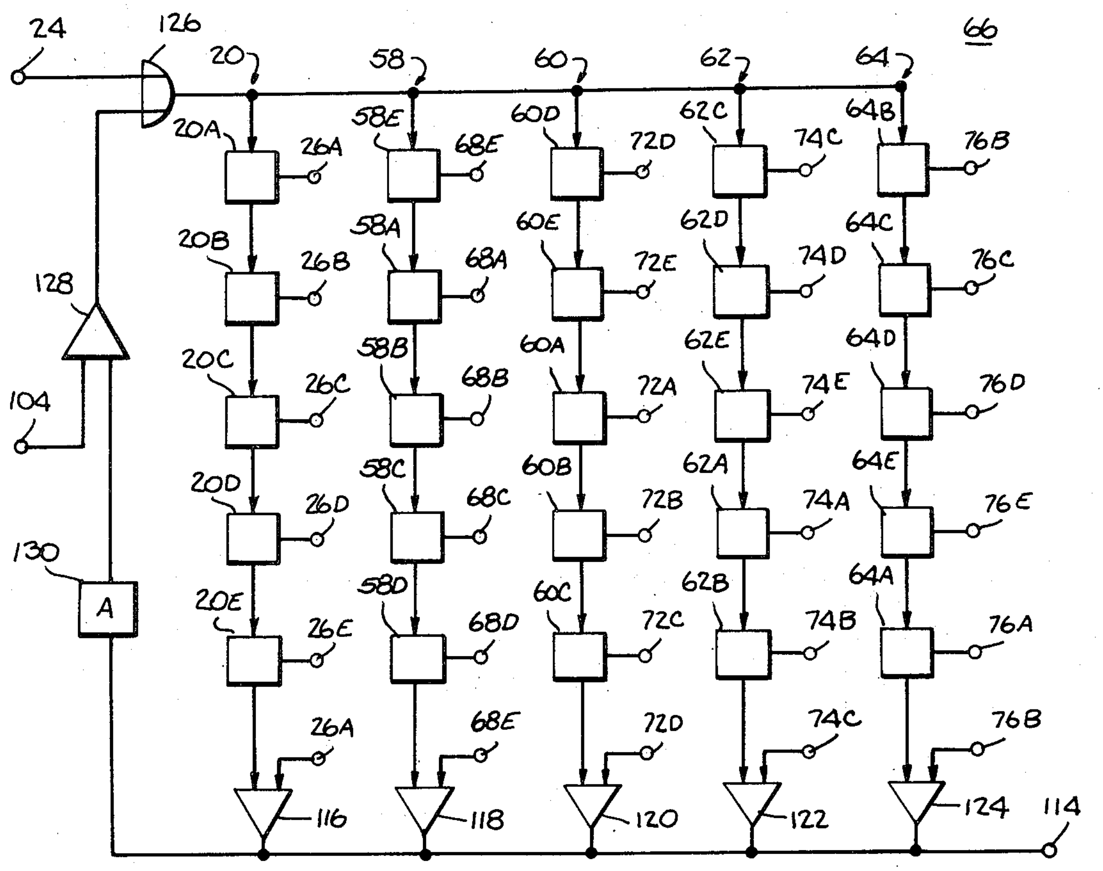
FIGS. 3 to 6 are schematic diagrams of four different shift registers each of which is a different embodiment of the present invention.

In FIG. 3, a shift register 66 is shown having five shift register columns 20, 58, 60, 62 and 64, arranged as a matrix to cooperate together. The shift register columns 58, 60, 62 and 64 have substantially the same structure as the shift register column 20 shown separately in FIG. 1.

Shift register column 58 includes five stages 58E and 58A – 58D, connected in series in the order named, which stages are structurally the same as stages 20A – 20E. Each of the stages 58E and 58A – 58D includes a corresponding one of the five shift pulse terminals 68E, and 68A – 68D.

As in column 20 of the shift register, column 58 receives pulses on the shift pulse terminals from the ring counter 22 shown in FIG. 1 with each shift pulse terminal receiving the output from a correspondingly lettered stage of the ring counter 22, so that terminal 68E is connected to receive the output of stage 22E, terminal 68A is connected to receive the output from the stage 22A, and so on.

Similarly, the columns 60, 62 and 64 each include five stages connected in series in the listed order, which is: (1) 60D, 60E, 60A, 60B, and 60C in column 60; (2) 62C, 62D, 62E, 62A, and 62B in column 62; and (3) 64B, 64C, 64D, 64E and 64A in column 64. Each of the stages 60A – 60E, 62A – 62E, 64A – 64E has a corresponding one of the shift pulse terminals 72A – 72E, 74A – 74E, and 76A – 76E.

To read data from the columns 20, 58, 60, 62 and 64 into the output terminal 114 of the shift register 66, five two-input AND gates 116, 118, 120, 122, and 124 are provided. One input of each such AND gate is connected to a respective one of the last stages 20E, 58D, 60C, 62B and 64A of the columns, while the other input is connected to one of the illustrated terminals 26A, 68E, 72D, 74C and 76B, and their outputs are each connected to the output terminal 114. To provide the output data from the columns to the output terminal 114, the terminals 26A, 68E, 72D, 74C and 76B, which are connected to the outputs of the respective stages 22A, 22E, 22D, 22C and 22B of the ring counter 22, receive shift pulses 56, 48, 50, 52 and 54, respectively.

In the embodiment of FIG. 3, the data input terminal 24 is electrically connected to the input of each of the columns 20, 58, 60, 62 and 64 through one of the inputs of a two-input OR gate 126. For recirculation of data, a two-input AND gate 128 has its output electrically connected to the other input of the OR gate 126. A recirculate terminal 104 is connected to one of the two inputs of the AND gate 128 and the other input is connected to the outputs of each of the AND gates 116, 118, 120, 122 and 124 through a return amplifier 130.

OPERATION OF THE FIRST EMBODIMENT

In operation, data is read into the shift register 66 by applying it to terminal 24. Each bit of data is channeled to the proper one of the first stages 20A, 58E, 60D, 62C or 64B by the phase shift pulses applied to terminals 26A, 68E, 72D, 74C, and 76B of the first stages. The first stage of a different column is empty at each clock pulse time and receives a shift pulse so that, in normal operation, five bits of data are entered into stages 58E, 60D, 62C, 64B, and 20A in that order in five successive clock pulse times.

To recirculate data from the outputs of the AND gates 116, 118, 120, 122 and 124, a recirculate pulse applied to the terminal 104 opens the AND gate 128 to pass the bits of data through the OR gate 126 to the first stages of the columns 20, 58, 60, 62 and 64 from the respective ones of the last stages 20E, 58D, 60C, 62B, and 64A of the columns 20, 58, 60, 62 and 64. The bits are written into the proper stages by the shift pulses applied to the shift pulse terminals of these stages.

Data is shifted through the shift register 66 in the following sequence:

A phase A shift pulse 56 is simultaneously applied to the following terminals, which are (1) shift pulse terminal 26A of stage 20A and of AND gate 116; (2) shift pulse terminal 68A of stage 58A; (3) shift pulse terminal 72A of stage 60A; (4) shift pulse terminal 74A of stage 62A; and (5) shift pulse terminal 76A of stage 64A.

When the phase A pulse 56 is applied to these terminals, the following operations take place, which are: (1) one bit of data is shifted from stage 20E through AND gate 116 to the shift register output terminal 114, leaving stage 20E empty; (2) one bit of data is shifted into empty stage 20A through OR gate 126 from the data input terminal 24, if available, or if gate 128 is receiving a pulse from terminal 104 to recirculate data, the bit of data from stage 20E is read through AND gate 128 and OR gate 126 into empty stage 20A; (3) one bit of data is read from stage 58E to empty stage 58A, leaving stage 58E empty; (4) one bit of data is read from stage 60E to empty stage 60A, leaving stage 60E empty; (5) one bit of data is read from stage 62E into empty stage 62A, leaving stage 62E empty; and (6) one bit of data is read from stage 64E, into empty stage 64A, leaving stage 64E empty.

The next clock pulse 46 causes the ring counter 22 to generate the phase E shift pulse 48. This shift pulse is applied to the following terminals, which are: (1) terminal 26E of stage 20E; (2) terminal 68E of stage 58E, and of AND gate 118; (3) terminal 72E of stage 60E; (4) terminal 74E of stage 62E; and (5) terminal 76E of stage 64E.

Shift pulse 48 causes the following operations to occur, which are: (1) one bit of information is read from stage 20D into empty stage 20E, leaving stage 20D empty; (2) one bit of information is read from stage 58D through AND gate 118 to output terminal 114, leaving stage 58D empty; (3) one bit of information is read either from input terminal 24, or from stage 58D through AND gate 128 and OR gate 126, into empty stage 58E depending on whether a bit of data is available at terminal 24 or the recirculation terminal 104 is receiving a voltage; (4) one bit of data is read from stage 60D into empty stage 60E, leaving stage 60D empty; (5) one bit of data is read from stage 62D into empty stage 62E, leaving stage 62D empty; and (6) one bit of data is read from stage 64D into empty stage 64E, leaving stage 64D empty.

The next three clock pulses 46 cause ring counter 22 to generate phases D, C and B shift pulses 50, 52 and 54 in succession. These shift pulses are applied to the corresponding terminals identified in FIG. 3 by reference numerals with the letter of the phases D, C and B as a suffix.

The shift pulses 50, 52 and 54 cause operations of the shift register 66 that are analogous to the operations caused by the phases A and E shift pulses 56 and 48. They each cause one bit of information to be read from the last stage and another bit to be written into the first stage of a column of the shift register, leaving the last stage empty. They also cause one bit of information to be read from one stage to the next stage in each of the other columns, leaving the one stage empty. At the termination of each shift pulse, a new column has its first stage empty to receive the next bit written into the shift register.

At the end of the preceding sequence of operations, the next clock pulse again generates a phase A shift pulse 56 to repeat the sequence. Since there are an odd number of stages in each of the columns, the AND gates 116, 118, 120, 122 and 124 are inverting AND gates, for the reason explained in connection with FIG. 1.

With this shift register, each stage requires only one-half of the area on a substrate, and one-half as many components for a given storage capacity, as one stage of a conventional shift register. Moreover, since only the number of stages in one row of stages is shifted at a time in the operation of this shift register, rather than all of the stages shifting simultaneously, less power is consumed in the operation of the shift register.

SECOND SHIFT REGISTER EMBODIMENT

Figure 4:
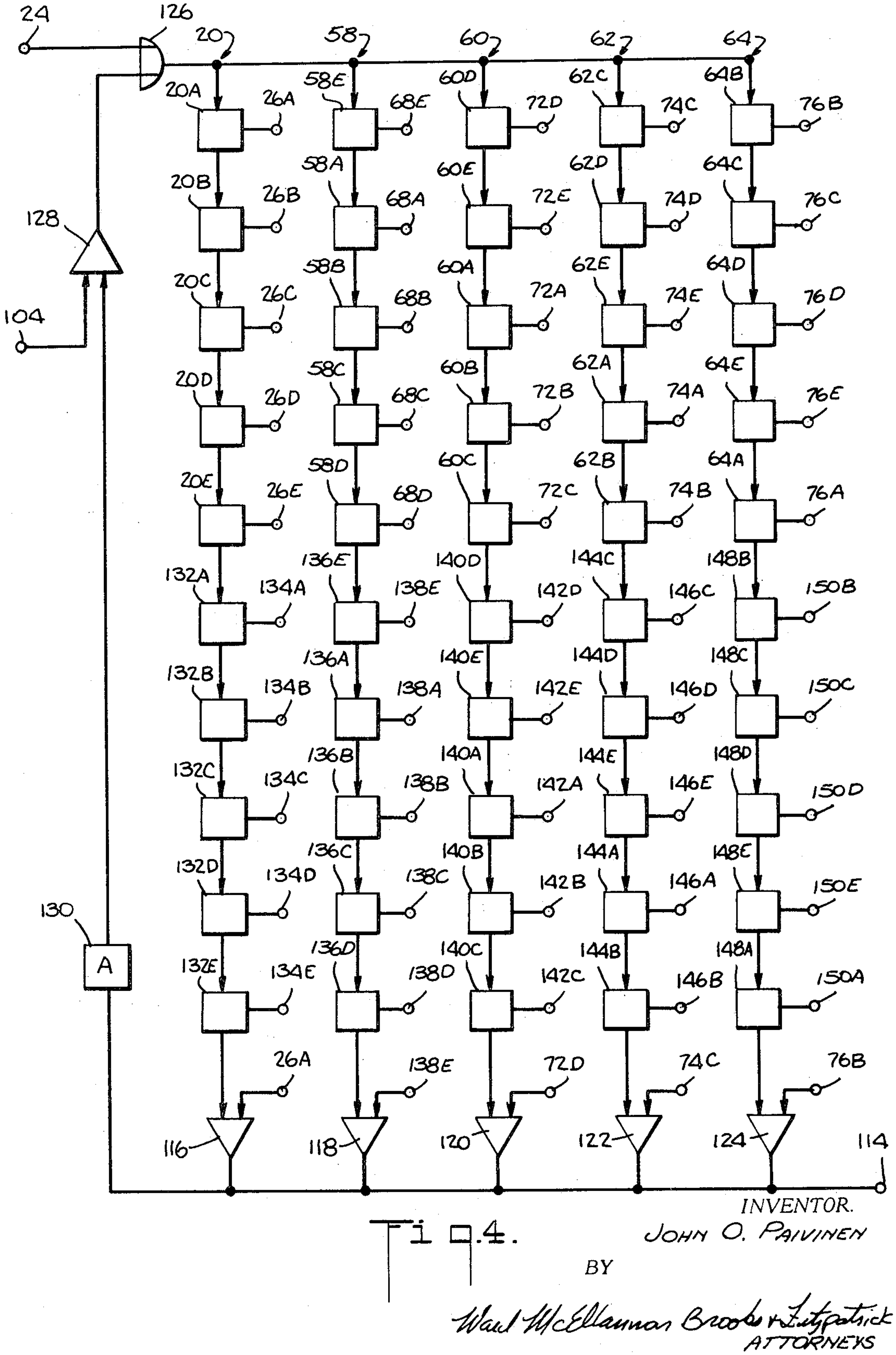

In FIG. 4, another shift register embodiment is shown which has some components that are the same as the components of the shift register shown in FIG. 3. These components are indicated by the same reference numerals they bear in FIG. 3.

In the embodiment shown in FIG. 4, the shift register is larger than the register of FIG. 3 but operates with the same number of shift pulses. Thus, it will be seen that each of the columns, 20, 58, 60, 62 and 64, has five additional stages added to it in series.

In column 20, between stage 20E and the AND gate 116 the following five stages are connected in series in the order named, which are: (1) stage 132A having shift pulse terminal 134A; (2) stage 132B having shift pulse terminal 134B; (3) stage 132C having shift pulse terminal 134C; (4) stage 132D having shift pulse terminal 134D; and (5) stage 132E having shift pulse terminal 134E.

Column 58 includes five additional stages connected in series in the order named between the stage 58D and the AND gate 118, which are: (1) stage 136E having shift pulse terminal 138E; (2) stage 136A having shift pulse terminal 138A; (3) stage 136B having shift pulse terminal 138B; (4) stage 136C having shift pulse terminal 138C; and (5) stage 136D having shift pulse terminal 138D. Similarly, columns 60, 62 and 64 include: (1) stages 140D to 140C with shift pulse terminals 142D to 142C; (2) stages 144C to 144B with shift pulse terminals 146C to 146B; and (3) stages 148B to 148A with shift pulse terminals 150B to 150A.

In operation, data is read into the columns 20, 58, 60, 62 and 64 in the same manner as in the embodiment of FIG. 3. The data is either recirculated from the gates 116, 118, 120, 122 and 124, or enters from terminal 24, into the stages 20A, 58E, 60D, 62C and 64B at the top of the columns 20, 58, 60, 62 and 64.

The primary difference in the operation of the circuit of FIG. 4 from the circuit of FIG. 3 is that there are two empty stages in each of the columns at all times. These stages are shifted along each column from the end of the column toward the beginning of the column. For example, phase A pulse 56 is applied to the following terminals, which are: (1) 26A of stage 20A and of AND gate 116; (2) 134A of stage 132A; (3) 68A of stage 58A; (4) 138A of stage 136A; (5) 72A of stage 60A; (6) 142A of stage 140A; (7) 74A of stage 62A; (8) 146A of stage 144A; (9) 76A of stage 64A; and (10) 150A of stage 148A.

The shift pulse 56 causes the following operations to occur, which are: (1) one bit of data is read into empty stage 20A; (2) one bit of data is read from stage 20E into empty stage 132A, leaving stage 20E empty; (3) one bit of data is read from the stage 132E through the AND gate 116 to the output terminal 114, leaving stage 132E empty; (4) one bit of data is read from stage 58E into empty stage 58A, leaving stage 58E empty; (5) one bit of data is read from stage 136E into empty stage 136A, leaving stage 136E empty; (6) one bit of data is read from 60E into empty stage 60A, leaving stage 60E empty and so on in a manner similar to the operation of the embodiment of FIG. 3.

When the last stage of the first five stages in each column, corresponding to the five stages in the embodiment of FIG. 3, is to be read, the first stage of the next five stages of the corresponding columns is empty and ready to receive a bit of data. With this arrangement, data is written into a series of empty stages, one stage for each clock pulse, from the first stage at the beginning of each of the columns 20, 58, 60, 62 and 64 down to the corresponding AND gates 116–124.

The embodiment shown in FIG. 4 is only illustrative of a system which increases the number of stages in a shift register without increasing the phases of timing pulses that must be used, and other longer shift registers using the same number of phases are also obviously possible. Accordingly, a ring counter such as 22 with a fixed number of stages applies all of the shift pulses necessary for several different sizes of shift registers.

THIRD SHIFT REGISTER EMBODIMENT

Figure 5:
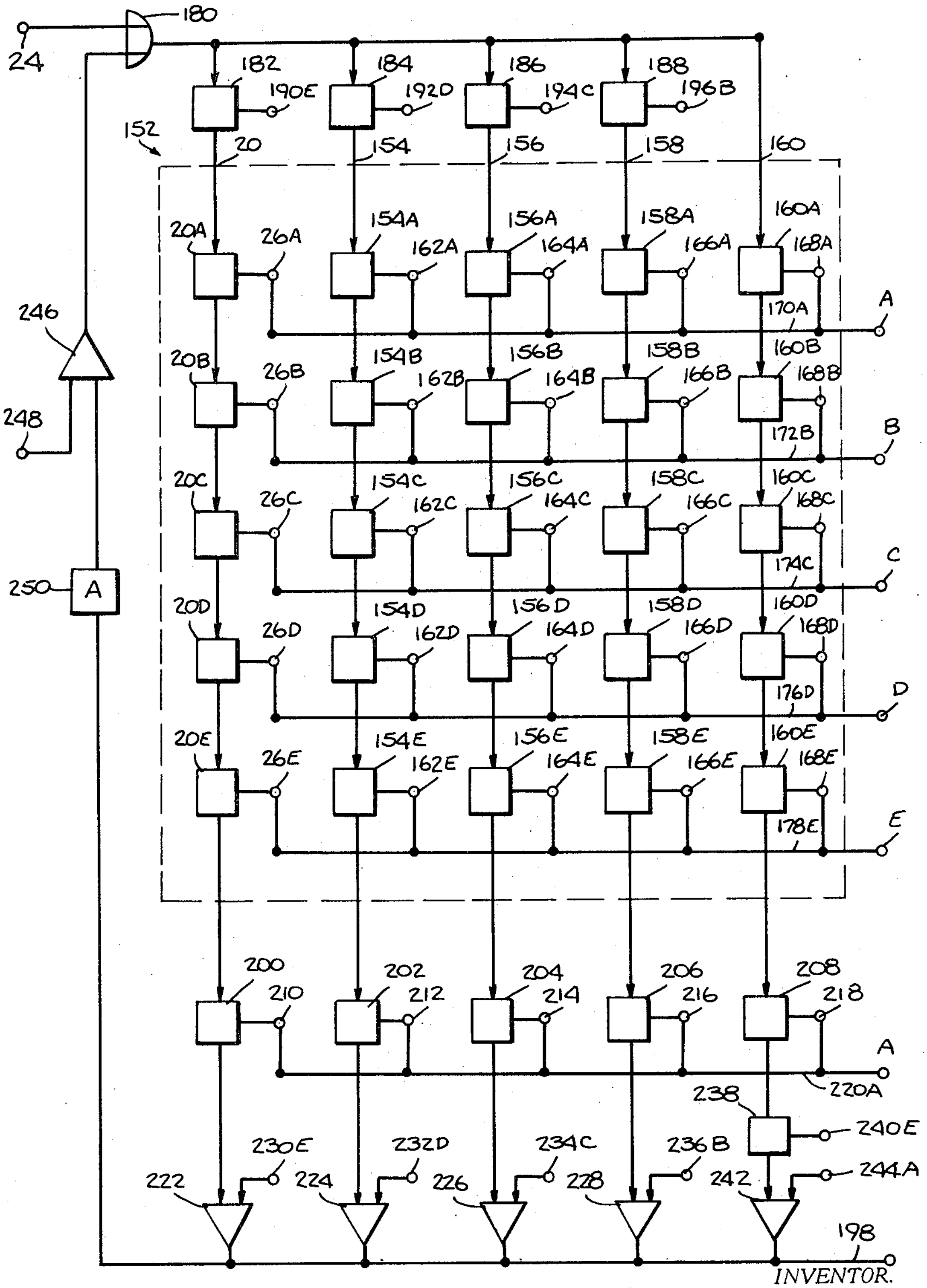

In FIG. 5, a shift register section 152 is shown having five shift register columns 20, 154, 156, 158 and 160, arranged as a matrix to cooperate together. The shift register columns 154, 156, 158 and 160 have substantially the same structure as column 20, which was described above in connection with FIG. 1.

The columns 20, 154, 156, 158 and 160 each include five stages connected in series in the order: (1) 20A – 20E in column 20; (2) 154A – 154E in column 154; (3) 156A – 156E in column 156; (4) 158A – 158E in column 158; and (5) 160A – 160E in column 160. Also, each of the stages 154A – 154E, 156A – 156E, 158A – 158E, 160A – 160E has a corresponding one of the shift pulse terminals 162A – 162E, 164A – 164E, 166A – 166E, and 168A – 168E. Accordingly, all of the columns 20, 154, 156, 158 and 160 are connected in the same sequence, and consequently the shift pulse terminals of the corresponding stages of these columns can be connected in common to receive the shift pulses from the ring counter 22 shown in FIG. 1.

Thus, as shown in FIG. 5, shift pulse terminals 26A, 162A, 164A, 166A and 168A are connected to bus 170A to receive phase A shift pulses; shift pulse terminals 26B, 162B, 164B, 166B and 168B are connected to bus 172B to receive phase B shift pulses; shift pulse terminals 26C, 162C, 164C, 166C and 168C are connected to bus 174C to receive phase C shift pulses; shift pulse terminals 26D, 162D, 164D, 166D and 168D are connected to bus 176D to receive phase D shift pulses; and shift pulse terminals 26E, 162E, 164E, 166E and 168E are connected to bus 178E to receive phase E shift pulses. The use of these aligned straight buses is especially desirable when the shift register is implemented by means of large scale integration techniques, since the buses avoid complicated cross-over paths.

In the embodiment of FIG. 5, the data input terminal 24 is connected through OR gate 180 directly to the first stage 160A of column 160 of the shift register, and indirectly through storage circuits 182, 184, 186 and 188 to the first stages 20A, 154A, 156A and 158A of columns 20, 154, 156, and 158, respectively. Each of the storage circuits 182, 184, 186 and 188 has a corresponding one of the shift pulse terminals 190E, 192D, 194C, and 196B, which are coupled to the ring counter 22 shown in FIG. 1 to receive phase E, D, C and B shift pulses, respectively.

To read data from the columns 20, 154, 156, 158 and 160 into the output terminal 198, the last stages of the columns are connected to a corresponding one of the storage circuits 200, 202, 204, 206 and 208, which have shift pulse terminals 210, 212, 214, 216 and 218, respectively, connected to bus 220A to receive phase A shift pulses. The storage circuits 200, 202, 204 and 206 are, in turn, connected to the output terminal 198 through AND gates 222, 224, 226 and 228, which have one input connected to a respective one of the storage circuits 200, 202, 204, and 206 and the other input connected to a respective one of the shift terminals 230E, 232D, 234C and 236B for receiving, respectively, shift pulses E, D, C and B. The remaining storage circuit 208 is connected to another storage circuit 238, which has a shift pulse terminal 240E for receiving phase E shift pulses. To advance data from the storage circuit 238 to the output terminal 198, a two-input AND gate 242 is provided with one input connected to the output of the storage circuit 238 and the other input connected through terminal 224A to the ring counter 22 of FIG. 1 to receive phase A shift pulses.

For circulation of data, if desired, a two-input AND gate 246 has its output electrically connected to the other input of the OR gate 180. One of the two-inputs of the AND gate 246 is connected to a recirculate terminal 248 and the other is connected to the output of an amplifier 250 which has its input connected to output terminal 198.

Data is advanced through the shift register 152 as follows:

A phase E shift pulse, the first of the sequence of shift pulses E, D, C, B and A, is simultaneously applied to shift terminal 190E of the storage circuit 182 and to all of the shift pulse terminals of the last stages 20E, 154E, 156E, 158E and 160E, causing the data applied to input terminal 24 to be stored in storage circuit 182, and causing the data stored in the stages 20D, 154D, 156D, 158D and 160D to be advanced simultaneously to last stages 20E, 154E, 158E and 160E. At the next phase interval, between $t_2$ and $t_4$, a phase D shift pulse is applied to the storage circuit 184 and simultaneously to all the phase shift terminals of the stages 20D, 154D, 156D, 158D and 160D to store input data applied at input terminal 24 in storage circuit 184, and simultaneously advance to stages 20D, 154D, 156D and 160D, data stored in their preceeding stages 20C, 154C, 156C, 158C and 160C.

The above described storing and advancing process is continued through phase intervals corresponding to phase shift pulses C and B, whereupon four successive bits of input data are stored sequentially in the storage circuits 182, 184, 186 and 188, and the data in the shift register section 152 has been shifted downwardly along the columns 20, 154, 156, 158 and 160, leaving the first stages 20A, 154A, 156A, 158A and 160A of register section 152 empty.

During the next and last phase shift interval of the sequence, a phase A shift pulse is applied simultaneously to shift pulse terminals of the first stages 20A, 154A, 156A, 158A and 160A, causing the data stored in the storage circuits 182, 184, 186 and 188 to be advanced simultaneously to the first stages 20A, 154A, 156A and 158A, and causing the data contemporaneously applied the input terminal 24 to be stored in the first stage 160A of column 160. During this same interval, the phase A shift pulse is also simultaneously applied to the phase shift terminals of storage circuits 200, 202, 204, 206 and 208 at the output of the register, causing the data stored in last register stages 20E, 154E, 156E, 158E and 160E to advance to these storage circuits, and leaving the last stages 20E, 154E, 156E, 158E and 160E empty and ready to begin the next sequence.

During this next sequence, the data previously stored in the storage circuits 200, 202, 204, 206 and 208 is sequentially advanced to the output terminal 198 in the same time sequence as originally presented to the input terminal 24, by the sequential operation of gates 222, 224, 226, 228 and 242. Thus, during the initial phase interval of such next sequence, a phase E shift pulse is applied to terminal 230E of AND gate 222 and to the shift pulse terminal 240E of the storage circuit 238, causing the data stored in storage circuit 200 to advance to the output terminal 198 and causing the data stored in storage circuit 208 to be advanced to storage circuit 238. During the next three time intervals, namely phases D, C and B, data is advanced sequentially from storage circuits 202, 204 and 206 through gates 224, 226 and 228 to the output terminal 198. During the last interval, corresponding to phase A, a phase A shift pulse is applied to the shift pulse terminal 244A of the gate 242, and to the shift pulse terminals of the storage circuits 200, 202, 204, 206 and 208, causing the data stored in storage circuit 238 to advance to the output terminal and causing the data then stored in the last stages 20E, 154E, 156E, 158E and 160E to advance to the storage circuits 200, 202, 204, 206 and 208.

FOURTH SHIFT REGISTER EMBODIMENT

The shift register shown in FIG. 5 can be expanded in storage capacity, while still operating with the same number of shift pulses. Such an arrangement is shown in FIG. 6, wherein components common to the shift register shown in FIG. 5 are indicated by the same reference numerals.

Figure 6:
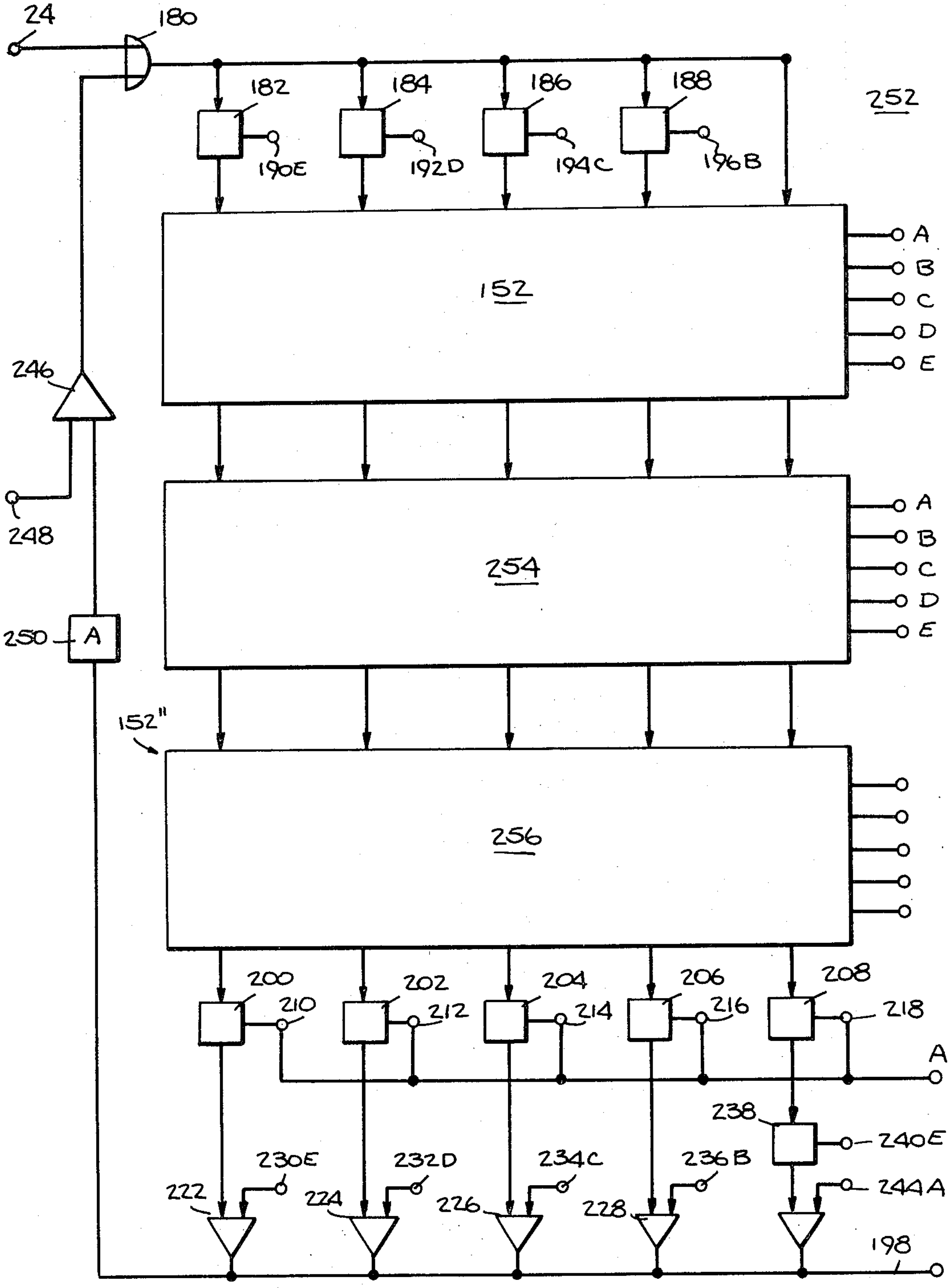

The shift register 252 shown in FIG. 6 has three series connected shift register sections 152, 254 and 256, which are connected at one end to the storage circuits 182, 184, 186 and 188 and input terminal 24 and at the other end to the storage circuits 200, 202, 204, 206 and 208. The register sections 254 and 256 have substantially the same structure as the register section 152 described above in connection with FIG. 5 and also operate with the same number of phases or shift pulses, namely phases A, B, C, D and E.

In operation, data is advanced to the input of register section 152, and then along the columns thereof and out of its last stages, in the same manner as in the embodiment of FIG. 5. However, instead of advancing the data from the last stages of the shift register section 152 directly to the storage circuits 200, 202, 204, 206 and 208, as in the embodiment of FIG. 5, this data is advanced to the first stages of the register section 254. The data is then advanced along the columns of register section 254 in the same manner as in the register section 152. When the data reaches the last stages of the register section 254, it is then advanced to the first stages of the register section 256. The data is then advanced along the columns of the register section 256 in the same manner as in the register sections 152 and 254, and while other data is being advanced along register sections 152 and 254, until it reaches the last stages thereof, and it is then advanced to the storage circuits 200, 202, 204, 206 and 208 in the same manner that the data is advanced to these storage circuits from the register section 152 described above in connection with FIG. 5.

The embodiment shown in FIG. 6 is only illustrative of a system which increases the storage capacity of the shift register shown in FIG. 5. Longer shift registers, using additional register sections, may be constructed using the same number of phases.

While the shift registers of FIGS. 5 and 6 have been shown with a parallel-to-series output converted in the form of storage circuits 200, 202, 204, 206, 208 and 238, a somewhat simpler converter can be achieved by deleting all of these storage units and the last stage of the left-most column of the last shift register section. Considering FIG. 5, the last stage 20E of column 20 would be deleted, and the output terminal from stage 20D connected directly to AND gate 222, while the output terminals of stages 154E, 156E, 158E and 160E would be connected directly to AND gates 224, 226, 228 and 242, respectfully. In this arrangement, when the phase E shift pulse is applied, the data in stage 20D is advanced to the output terminal 198, while the data in the remaining D stages of shift register 152 are merely advanced to the E stages, and new data is applied to storage unit 182. Thereafter, as the succeeding shift pulses are applied, in the sequence D–C–B–A, data is advanced sequentially from the stages 154E, 156E, 158E and 160E, respectively, to the output terminal 198, while the remaining data in the shift register 152 is sequentially advanced through stages C to D, B to C and A to B, and at the same time, the input storage units are being loaded sequentially, unit 184 at phase D, 186 at phase C, 188 at phase B, and the data in all of these units is transferred to the A stages at phase A, while a new data bit is being applied directly to stage 160A.

It should also be understood that while the shift registers of FIGS. 5 and 6 have been shown in a serial information bit flow, the shift register 152, and the similar registers 254 and 256, can be used in a parallel bit flow arrangement. For such use, the input and output storage units of FIGS. 5 and 6 are simply eliminated, and the information bits applied in parallel to the input terminals of the A stages of the shift register 152. These bits are delivered in parallel at a subsequent time (depending upon the number of phases) from the output terminals of the AND gates following the last stages of the respective columns (which AND gates contain inverters where the total number of stages is an odd number).

Further, the shift registers of FIGS. 5 and 6 can be used to perform a series-to-parallel conversion of the information bit flow, in addition to performing the shift register function, simply by utilizing the storage circuits 182, 184, 186 and 188 at the input of the shift register, but deleting the storage circuits 200, 202, 204, 206, 208 and 238 at the output. And conversely, these shift registers can be used to perform a parallel-to-series conversion by deleting the input storage circuits but retaining the output storage circuits.

This utilization of the shift register in parallel-to-parallel, series-to-parallel and parallel-to-series configurations is also true as to the shift registers of FIGS. 3 and 4. When several of the shift registers of these Figures are connected in tandem, as is done for two shift registers in FIG. 4, it will be seen that there is an unequal number of stages before the first A stage is reached in the respective columns. Also, there is an unequal number of stages after the last A stage in the respective columns. This unequal number of stages, at the input and output ends of the shift register, corresponds in function to the storage circuits at the input and output of the shift registers in FIGS. 5 and 6. By an appropriate elimination of one or both of these sections from the tandem shift registers of FIGS. 3 and 4, a parallel-to-parallel, series-to-parallel or parallel-to-series bit stream conversion can be effected.

SHIFT REGISTER STAGE

Figure 7:
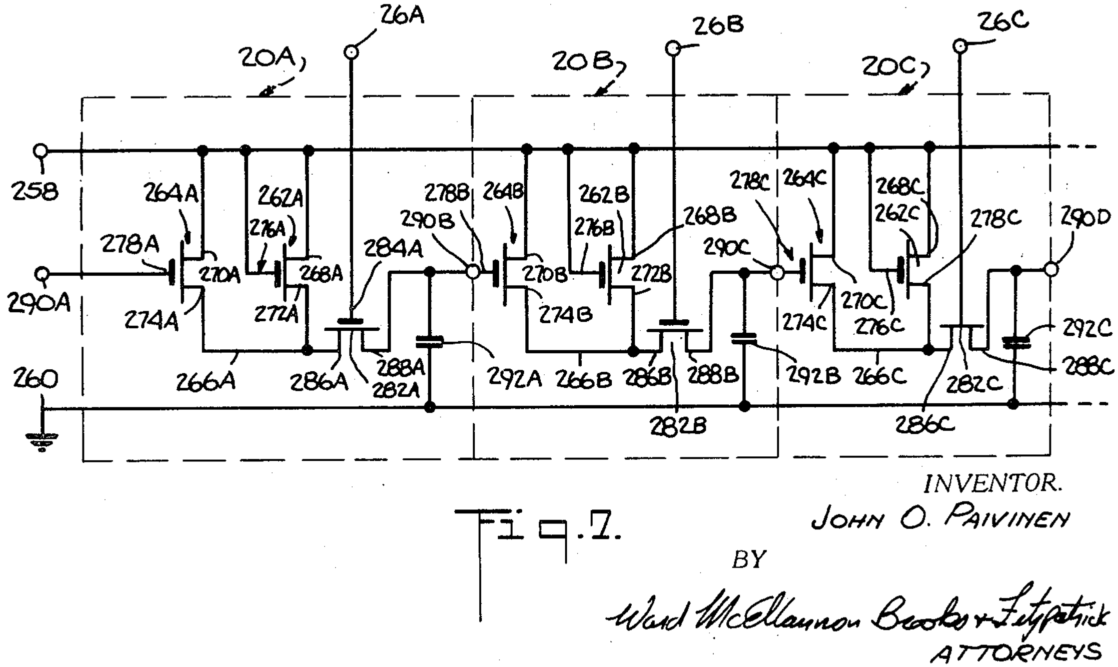
FIG. 7 is a schematic circuit diagram of three shift register stages that may be employed in any of the previously mentioned shift registers.

In FIG. 7, a schematic circuit diagram is shown of three identical shift register stages 20A, 20B and 20C, connected in series in the order named. Since all of the stages 20A, 20B and 20C are identical, the structure of one stage will be described and the same reference numerals will be used for each stage, except that the reference numerals indicating parts in stage 20A will bear the suffix A while the reference numerals used in stages 20B and 20C will have the suffixes B and C, respectively.

The stage 20A includes two clock pulse terminals 258 and 260 across which the clock pulses 46 of FIG. 2 are applied. Thus, clock pulses are applied to all of the stages of the shift register simultaneously. The shift pulses, on the other hand, are applied individually to one of the terminals 26.

Two MOS (metal-oxide-silicon) transistors or devices 262A and 264A are connected in parallel between the clock pulse terminal 258 and a common circuit point 266A, with the source 268A of transistor 262A and the drain 270A of transistor 264A connected to the clock pulse terminal 258, and the drain 272A of transistor 262A and the source 274A of the transistor 264A connected to the source 286A of transistor 282A at the common circuit point 266A. The gate 276 A of transistor 262A is also connected to terminal 258, while the gate 278A of transistor 264A is connected to input terminal 290A of the stage 20A.

The third MOS transistor 282A has its gate 284A connected to the shift pulse terminal 26A to receive phase A shift pulses 56. Its source 286A is connected to the common circuit 266A, as already noted, and its drain 288A is connected to the input terminal 290B of the second stage 20B. A capacitor 292A, which is the parasitic capacitance of the transistor 264B of the second stage 20B, exists between the drain 288A of the transistor 282A and terminal 260, which is at ground or reference potential.

In operation, during the phases E, D, C and B shown in FIG. 2, the transistor 282A is non-conducting. During each of these phases the clock pulses 46 are applied between of the terminals 258 and 260. The clock pulse 46, since it is applied to the gate 276A and the source 268A of the MOS transistor 262A, renders this transistor conductive. If there is a negative input signal on terminal 290A, the transistor 264A is also rendered conductive, but if there is no such signal, it is not. However, even though one of both of the transistors 262A and 264A are rendered conductive during these phases, no complete current path is established since transistor 282A is nonconductive during these phases. Thus, transistor 282A causes the charge of the capacitor 292A to remain unchanged during these phases.

During phase A, however, which is between times $t_8$ and $t_{10}$ in the curves of FIG. 2, the phase A shift pulse 56 is applied to the terminal 26A at the same time that the clock pulses are applied across terminals 258 and 260. This shift pulse renders the transistor 282A conductive, while the clock pulse renders transistor 262A conductive, thus establishing a current flow path and charging the capacitor 292A to the negative voltage of the clock pulse. If there is a negative charge on input terminal 290A during this time, the transistor 264A is also conductive, as already discussed, and in this event the capacitor 292A is charged through transistor 264A, as well as through transistor 262A.

At time $t_9$ the clock pulse terminates, rendering transistor 262A nonconductive. However, transistor 282A remains conductive until time $t_{10}$. If the transistor 264A is conducting between $t_9$ and $t_{10}$, capacitor 292A discharges through the clock pulse source (not shown), which then presents a low impedance path to the ground or reference terminal 260, and the common circuit point 266A consequently falls to ground potential if transistor 264A is nonconducting, however, the negative charge remains on capacitor 292A.

Similarly, the shift pulses are applied to the terminals 26 of the successive stages of each column of the shift register, a phase A shift pulse being applied to terminal 26A of stage 20A, a phase B shift pulse to terminal 26B of stage 20B, and so on. Further, a clock pulse is applied to all of the stages during the first portion of each such shift pulse, and terminated before the end of the shift pulse. As already indicated, when the phase A pulse is applied to terminal 26A, the transistor 282A becomes conducting and the negative clock pulse charges the capacitor 292A. The transistor 262A then becomes nonconductive at the termination of the clock pulse, while the transistor 282A remains conducting until the beginning of the next shift pulse, whereupon the capacitor 292A is selectively discharged if there is an input signal on input terminal 290A to render transistor 264A conductive.

This same action occurs in the successive stages 20B and 20C, as they are activated by phase B and C shift pulses on terminals 26B and 26C. Actually, as already discussed, the phase sequence is C–B–A when this circuit is employed in the shift registers discussed.

The voltage across capacitor 292A of stage 20A represents a bit of information, and results in a potential being applied to the input terminal 290B of the second stage 20B. During phase B, this bit is transferred to stage B in the same manner that the phase A shift pulse resulted in the transfer of a bit to stage A in response to a signal on its input terminal 290A. Accordingly, if the voltage across capacitor 292A is essentially zero, so that a ground level potential appears at input terminal 290B of stage 20B, because input terminal 290A had a negative potential that caused the transistor 264A to be conducting during the last portion of the phase A shift pulse to discharge capacitor 292A, then transistor 264B will be nonconducting during the last portion of the phase B shift pulse, resulting in a negative charge being produced and retained on capacitor 292B, thus providing the transfer of an inverted bit of information from stage A to stage B of a column of the shift register.

Other types of individual stages may be used to implement the shift registers of FIGS. 1–6, such as for example a stage of the type which employs only a shift pulse to carry out the transfer and storage. For example, each stage may comprise an inverter circuit, which employs two MOS transistors of like conductive material in a circuit arrangement as shown in FIG. 2 of U.S. Pat. No. 3,322,974, issued May 30, 1967 to Richard W. Ahrons et al., and a third MOS transistor which defines a transmission gate between the output of the inverter circuit and the input of the next stage. Alternatively, each stage may comprise a pair of complimentary MOS transistors in an inverter circuit arrangement as shown in FIG. 1 of said U.S. Pat. No. 3,322,974, and a third MOS transistor which, as in the previously discussed arrangement, defines a transmission gate between the output of the inverter circuit and the input of the next stage. In both of these alternative arrangements, a shift pulse is applied to the gate electrode of the third MOS transistor to operate this transistor and allow transmission between the inverter and the input of the next stage. In this way, during the occurrence of the shift pulse, the input parasitic capacitance of the next stage or other associated circuit is charged in inverse relation to the value of the signal applied to the input of the inverter circuit.

It should be understood that while the shift register in FIG. 7 has been explained as being separated into stages at junctions 290B, 290C and 290D, it could equally well be viewed as having stages which terminate at the drain terminals 288A, 288B and 288C, with the parasitic capacitances 292A, 292B and 292C beginning the next stage. In such a perspective, the stage being pulsed by a shift pulse, such as stage 20B, would be advancing the information stored therein (in capacitance 292A) to its output terminal at the drain 288B. It is, however, of no consequence to the operation of the circuit where the stages are deemed to begin and end.

It should also be understood that other forms of shift register stages, other than MOS transistor circuits, may be used in the implementation of applicant's novel shift register. This includes magnetic cores, other solid state memory devices and virtually any other form of memory unit. Also, while the shift register sections of FIGS. 3 to 5 show a 5 by 5 configuration of stages, this number may be increased or decreased, depending upon the storage and transfer requirements to be met. Further, while two of these matrices have been cascaded in FIG. 4, and three in FIG. 6, it will be apparent that this number may be increased very substantially.

Although specific embodiments of the invention have been described in some detail, many modifications and variations of the invention are possible in the light of the above teachings. It is therefore to be understood that, within the scope of the appended claims, the invention may be practiced otherwise than as specifically described.

What is claimed is:

1. A multi-phase shift register comprising a plurality of shift register channels arranged in parallel, each such channel having an input and an output terminal and including n data storage circuits connected serially between said terminals in the sequence of one to *n*, where *n* is greater than 3, each channel being capable of storing *n*—1 bits of data, a shift terminal connected to each such data storage circuit, input means for applying input data bits in the form of electrical signals to the respective input terminals of said channels, means for advancing successive ones of said data bits along different ones of said parallel channels, with the first data bit being advanced along a first such channel and each following data bit being advanced along a different channel, to continuously advance successive data bits along different ones of the parallel channels according to a predetermined distribution pattern, and then repeating said pattern, said advancing means including switching means for applying shift signals sequentially to the shift terminals of the storage circuits in each channel in the sequence of circuit *n*, circuit *n*—1, and so forth to circuit one, and then repeating such sequence, an output circuit connected to the $n^{th}$ circuit of each of said channels, and means for synchronizing the receipt of data bits from said input means, and the delivery of data bits to said output circuit, with the advancement of the data bits along said channels to cause at least one data bit to be received and at least one to be delivered with each advancement of data bits along the channels.

2. A shift register as in claim 1 having at least three, and more than *n*/2, parallel shift register channels.

3. A shift register as in claim 1 having *n* parallel shift register channels.

4. A shift register as in claim 1, wherein the means for advancing data includes means for staggering the advancement of the data in the different parallel channels such that in each such channel the data is being advanced from its $n^{th}$ circuit to the output terminal of the channel while in a different channel the data is being advanced from the *n*—1 circuit to the $n^{th}$ circuit.

5. A shift register as in claim 4, wherein the shift terminals of the circuits of the different parallel channels are interconnected, with the shift terminal of the $n^{th}$ circuit of each such channel being connected to the shift terminal of the *n*—1 circuit of a different channel and to the shift terminal of the next lower order circuit of each successive channel thereafter.

6. A shift register as in claim 4, wherein the input terminals of the respective shift register channels are connected electrically in common.

7. A shift register as in claim 4, further including a plurality of gate circuits, each having an input and an output terminal, with the output terminals thereof connected in common and the input terminals connected to the respective output terminals of the parallel shift register channels, and means for energizing said gate circuits sequentially.

8. A shift register as in claim 7, wherein the input terminals of the respective shift register channels are connected in common, further including a recirculating path between said common input terminals and the common output terminals of said gate circuits, an additional gate circuit in said recirculating path, and means for selectively energizing said additional gate circuit to effect data recirculation through said shift register channels.

9. A shift register as in claim 1, wherein the means for advancing data includes means for synchronizing the advancement of the data in said parallel channels such that the data in the $n^{th}$ circuits of all of said channels is advanced simultaneously and the data in each successive lower order circuit is likewise advanced simultaneously in all channels.

10. A shift register as in claim 9, wherein the shift terminals of the $n^{th}$ circuits of all of the parallel channels are interconnected and the shift terminals of the respective lower order circuits of all of the channels are likewise interconnected.

11. A shift register as in claim 9, wherein the means for applying input data bits includes means for grouping said data bits and means for inserting said grouped data bits simultaneously into the first circuits of the respective parallel shift register channels.

12. A shift register as in claim 11, wherein said means for applying input data bits includes means for receiving a series of the data bits sequentially and delaying the bits with respect to each other and inserting such delayed bits simultaneously into the first circuits of the respective parallel shift register channels.

13. A shift register as in claim 12, wherein said means for delaying a series of data bits includes storage circuits connected to the respective input terminals of the parallel shift register channels.

14. A shift register as in claim 13, further including means for synchronizing the storage of data in said storage circuits with the advancement of the data along the channels such that the storage circuits are all filled with data bits when the data has been advanced out of the first circuit of each channel.

15. A shift register as in claim 9, further including means for storing the data bits simultaneously advanced from the $n^{th}$ circuits of substantially all of said parallel channels, and means for sequentially advancing said data bits from said storage means to an output terminal.

16. A shift register as in claim 15, further including means for synchronizing the sequential advance of said data bits from said storage means with the advancement of data along said parallel channels.

17. A shift register as in claim 16, wherein said synchronizing means causes one data bit to be advanced from said storage means with each advancement of the data along the parallel channels, and wherein all of the data bits in the storage means are advanced by the time of the next advancement of data bits simultaneously from the $n^{th}$ circuits of all of the parallel channels into the storage means.

18. A shift register as in claim 9, wherein the shift terminals of the $n^{th}$ circuits of all of the parallel channels are interconnected by a straight conductor, the shift terminals of the $n-1$ circuits of all channels are interconnected by a second straight conductor substantially parallel to the first, and each of the remaining circuits of like order of the respective channels are interconnected by a straight conductor substantially parallel to the first and second.

19. A multi-phase shift register comprising a plurality of n shift register channels arranged in parallel, where $n$ is greater than 2, each such channel having an input and an output terminal and including $n$ data storage circuits connected serially between said terminals in the sequence of one to $n$, each channel being capable of storing $n-1$ bits of data, a shift terminal connected to each such data storage circuit, input means for applying input data bits in the form of electrical signals to the respective input terminals of said channels, and means for advancing successive ones of said data bits along different ones of said parallel channels, simultaneously and synchronously, said advancing means including switching means for applying shift signals sequentially to the shift terminals of the storage circuits in each channel in the sequence of circuit $n$, circuit $n-1$, and so forth to circuit one, and then repeating such sequence.

20. A multi-phase shift register as in claim 19, wherein said input means includes means for receiving data bits one after another and for distributing said data bits to said $n$ parallel channels one after the other, so that the successive data bits pass to different parallel channels until all $n$ channels have received a data bit and the distribution sequence is then repeated, further including an output circuit means for receiving data bits from the $n^{th}$ circuits of all of said parallel channels, one channel after the other until a data bit has been received from all n channels, and for delivering said data bits to a common terminal, one data bit after the other, in the same sequence as they were received by said distributing means, and means for synchronizing said input means and said output means with the advancement of the data bits along said channels so that one data bit is received from said input means and one data bit is delivered by said output means with each advancement of data bits along the channels.

21. A multi-phase shift register as in claim 19, wherein said advancing means constitutes means for applying a first pulse to all of the storage circuits of each channel and a second pulse to only one storage circuit in each channel.

22. A multi-phase shift register as in claim 19, wherein said data storage circuits each contain just a single storage location which represents a binary data bit of either "1" or "0" significance, the data bit being stored as either a high or low voltage level.

23. A multi-phase shift register as in claim 19, wherein each storage circuit is binary in character and delivers a data bit of binary significance "1" to the succeeding storage circuit, or to an output terminal in the case of the $n^{th}$ circuits, only if it is in a particular one of its binary states, and not if it is in its other binary state.

24. A multi-phase shift register comprising a plurality of $n$ shift register channels arranged in parallel, where $n$ is greater than 3, each such channel having an input and an output terminal and including at least n data storage circuits connected serially between said terminals in the sequence of one to $n$, each channel being capable of storing at least $n-1$ bits of data, a shift terminal connected to each such data storage circuit, input means for applying input data bits in the form of electrical signals to the respective input terminals of said channels, and means for advancing said data bits along different ones of said parallel channels, said advancing means including control means for applying n shift signals sequentially to the shift terminals of the storage circuits in each channel in the sequence of circuit $n$, circuit $n-1$, and so forth to circuit one, and then repeating such sequence.

25. A multi-phase shift register as in claim 24, wherein the input means includes means for receiving a series string of data bits in a predetermined sequence and distributing said data bits to different ones of said $n$ parallel channels, so that every $n^{th}$ bit passes along the same channel but all other bits pass along different channels, and further including an output circuit for receiving data bits from the $n^{th}$ stages of all of said parallel channels and recombining said data bits into a series string of bits in said predetermined sequence, said distributor means and output circuit means operating under control of said control means.

26. A multi-phase shift register as in claim 25, wherein the control means includes means for synchronizing the input means and output circuit with the advancement of data bits along the channels to deliver one data bit from the output circuit with each advance of the data bits along the channels.

27. A multi-phase shift register comprising a plurality of shift register sections arranged in series, with the output of each except the last being connected to the input of the next, each such section including a plurality of shift register channels arranged in parallel, each channel having an input and an output terminal and including n data storage circuits connected serially between said terminals in the sequence of one to $n$, where $n$ is greater than 3, each channel being capable of storing $n-1$ bits of data, circuit means connecting the output terminals of the respective channels of each such section to the input terminals of the channels of the next succeeding section of the series, to connect the corresponding channels of the succeeding sections in series, a shift terminal connected to each such data storage circuit, circuit means connecting in common the corresponding shift terminals of the serially connected channels of the successive sections, input means for applying input data bits in the form of electrical signals to the respective input terminals of the channels of the first such section, means for advancing successive ones of said data bits along different ones of said parallel channels of said first section and then along the corresponding channels of each succeeding section, said advancing means including switching means for applying shift signals sequentially to the shift terminals of the storage circuits in each section to advance the data bits through each such section in sequence, said signals being applied to the circuits in each channel in the sequence of circuit $n$, circuit $n-1$, and so forth to circuit one, and then being repeated.

28. A multi-phase shift register as in claim 27, wherein each section includes n parallel channels.

29. A multi-phase shift register as in claim 27, wherein the means for advancing data includes means for staggering the advancement of the data in the different parallel channels of each section such that in each such channel the data is being advanced from its $n^{th}$ circuit to the output terminal of the channel while in a different channel the data is being advanced from the $n-1$ circuit to the $n^{th}$ circuit thereof.

30. A multi-phase shift register as in claim 29, wherein the shift terminals are interconnected, with the shift terminal of the $n^{th}$ circuit of each channel of one such section being connected to the shift terminal of the $n-1$ circuit of a different channel of the same section and to the shift terminal of the next lower order circuit of each successive channel of such section.

31. A multi-phase shift register as in claim 29, wherein the input means includes means for inserting said data bits sequentially into said channels, one channel after the other, in synchronism with the advancement of the data along the sections.

32. A multi-phase shift register as in claim 27, wherein said input means includes means for receiving a series of the data bits sequentially and delaying the bits with respect to each other and inserting such delayed bits simultaneously into the first circuits of the respective channels of the first section, and further including means for synchronizing said input means with the advancement of data along said channels to receive a data bit with each advancement of data along a channel.

* * * * *